(12) United States Patent
Carnevali

(10) Patent No.: US 8,366,468 B2
(45) Date of Patent: Feb. 5, 2013

(54) CONNECTOR ISOLATOR SYSTEM

(76) Inventor: Jeffrey D. Carnevali, Seattle, WA (US)

( * ) Notice: Subject to any disclaimer, the term of this patent is extended or adjusted under 35 U.S.C. 154(b) by 352 days.

(21) Appl. No.: 12/806,721

(22) Filed: Aug. 18, 2010

(65) Prior Publication Data

US 2012/0045931 A1  Feb. 23, 2012

(51) Int. Cl.
*H01R 13/64* (2006.01)
(52) U.S. Cl. .......................... 439/248; 439/384; 439/544
(58) Field of Classification Search ................... 439/247, 439/248, 382, 384, 544
See application file for complete search history.

(56) References Cited

U.S. PATENT DOCUMENTS

| | | | | |
|---|---|---|---|---|
| 4,361,372 A * | 11/1982 | Majkrzak et al. | ............ | 439/247 |
| 5,397,244 A * | 3/1995 | Generoli et al. | ............ | 439/248 |
| 5,845,885 A * | 12/1998 | Carnevali | ................... | 248/181.1 |
| 6,422,885 B2 * | 7/2002 | Kain et al. | ................... | 439/247 |
| 6,527,572 B2 * | 3/2003 | Jou | ................... | 439/248 |
| 7,090,521 B2 * | 8/2006 | Nishio et al. | ................... | 439/248 |
| 7,311,541 B2 * | 12/2007 | Chien et al. | ................... | 439/246 |
| 2002/0048982 A1 * | 4/2002 | Gu et al. | ................... | 439/247 |
| 2006/0105603 A1 * | 5/2006 | Nishio et al. | ................... | 439/247 |
| 2012/0045931 A1 * | 2/2012 | Carnevali | ................... | 439/544 |
| 2012/0045932 A1 * | 2/2012 | Carnevali | ................... | 439/552 |
| 2012/0206875 A1 * | 8/2012 | Carnevali | ................... | 361/679.41 |

* cited by examiner

*Primary Examiner* — James Harvey
(74) *Attorney, Agent, or Firm* — Charles J. Rupnick Attorney at Law

(57) ABSTRACT

A connector isolator system, having a backstop spaced a fixed distance away from an interface surface; a printed circuit board (PCB) or other connector carrier member that is movable between the backstop and the interface surface, and further comprising one or more in-plane isolators; an electrical connector mounted on the connector carrier member in a position to pass through an aperture in the interface surface; and one or more biasing members arranged between the backstop and the connector carrier member for urging the connector carrier member toward the interface surface and the electrical connector through the aperture.

20 Claims, 6 Drawing Sheets

CONNECTOR ISOLATOR SYSTEM

FIELD OF THE INVENTION

The present invention relates generally to docking stations for portable computing devices, and in particular to isolators for retaining secure connection of expansion connectors of active docking stations with input/output (I/O) communication ports of portable computers and other portable computing devices seated in the docking station.

BACKGROUND OF THE INVENTION

Docking stations for portable computers and other portable computing devices are generally well-known, including active docking stations having an expansion connector connectable with an input/output (I/O) communication port of a portable computer and other portable computing device seated therein.

However, known active docking station apparatus are limited in their ability to efficiently provide secure connection between the expansion connector of the docking station apparatus and the I/O communication port of the portable computer or other portable computing device during exposure to shock and vibration environments applied along the direction of insertion of the expansion connector.

SUMMARY OF THE INVENTION

The present invention is an isolator for an expansion connector of an active docking station, where the expansion connector is connectable with an input/output (I/O) communication port of a portable computer and other portable computing device seated in the docking station.

According to one aspect of the connector isolator system, the system includes a backstop that is spaced a fixed distance away from an interface surface; a PCB or other connector carrier member that is movable between the backstop and the interface surface and has one or more in-plane isolators; an electrical connector that is mounted on the connector carrier member in a position to pass through an aperture in the interface surface; and one or more biasing members that are arranged between the backstop and the connector carrier member for urging the connector carrier member toward the interface surface and the electrical connector through the aperture.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

As required, a detailed illustrative embodiment of the present connector isolator is disclosed herein. However, techniques, systems and operating structures in accordance with the present connector isolator may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present connector isolator. The following presents a detailed description of an illustrative embodiment (as well as some alternative embodiments) of the present connector isolator.

In the Figures, like numerals indicate like elements.

Figure 1:
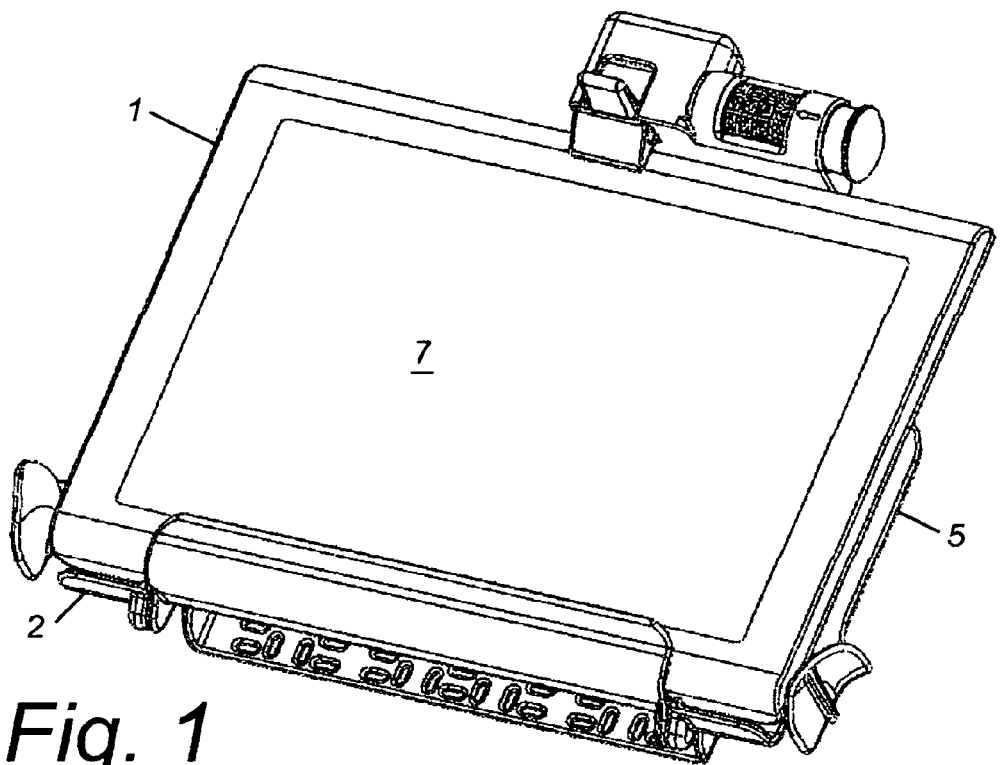
FIG. 1 shows a portable computer or other portable computing device seated in a docking tray of a docking station.

FIG. 1 shows a portable computer or other portable computing device 1 seated in a docking tray 3 of a docking station 5. Such portable computing devices 1 are generally provided with one or more connectors and ports for function expansion, usually on the rear face of its casing which supports its display unit 7. These portable computing devices 1 are furnished with additional functions by connecting peripheral devices, such as a hard disk drive, mouse, printer, etc., to the connectors and ports.

Figure 2:
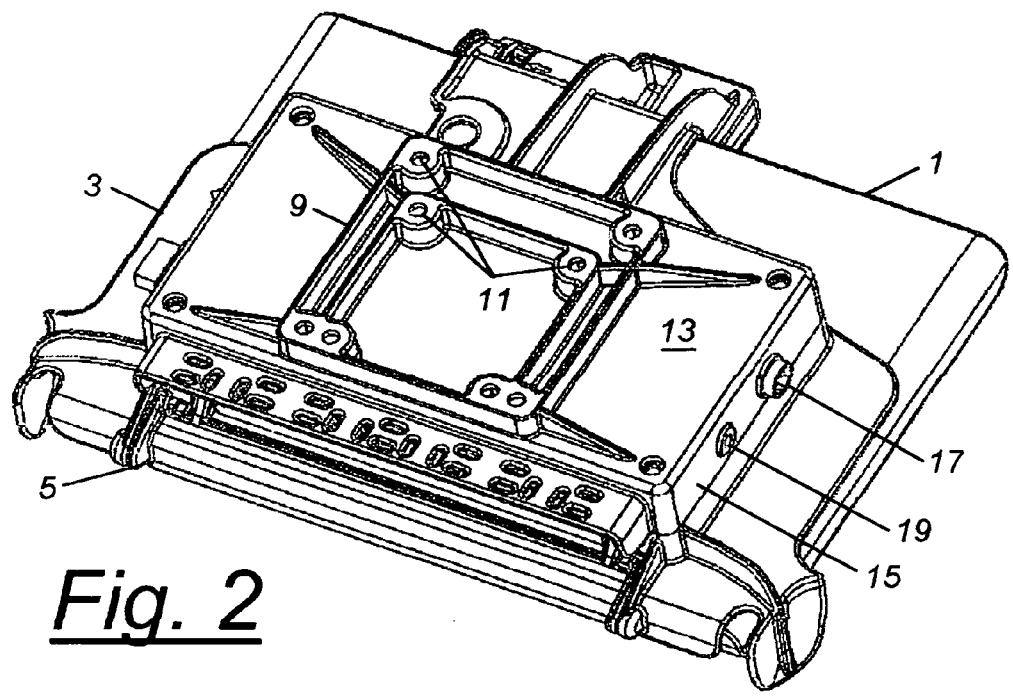
FIG. 2 shows a backside of the docking tray which includes an expansion module.

FIG. 2 shows the backside of docking tray 3 which includes a mounting structure 9 that is structured to adapt docking station 5 for mounting to an external support structure, by example and without limitation, a universally positionable device invented by the inventor of the present invention as disclosed in U.S. Pat. No. 5,845,885, which is incorporated herein by reference. By example and without limitation, mounting structure 9 is provided as a plurality of mounting holes 11 projected from a bottom plane 13. Other mounting structures 9 are also contemplated and may be substituted without departing from the spirit and scope of the invention.

Docking station 5 includes an expansion module 15, for example, integrated with mounting structure 9. Expansion module 15 includes, for example, a power adaptor port 17 for connecting an external power supply and a data input/output (I/O) port 19 such as a Universal Serial Bus (USB) port or other data transfer port.

Figure 3:
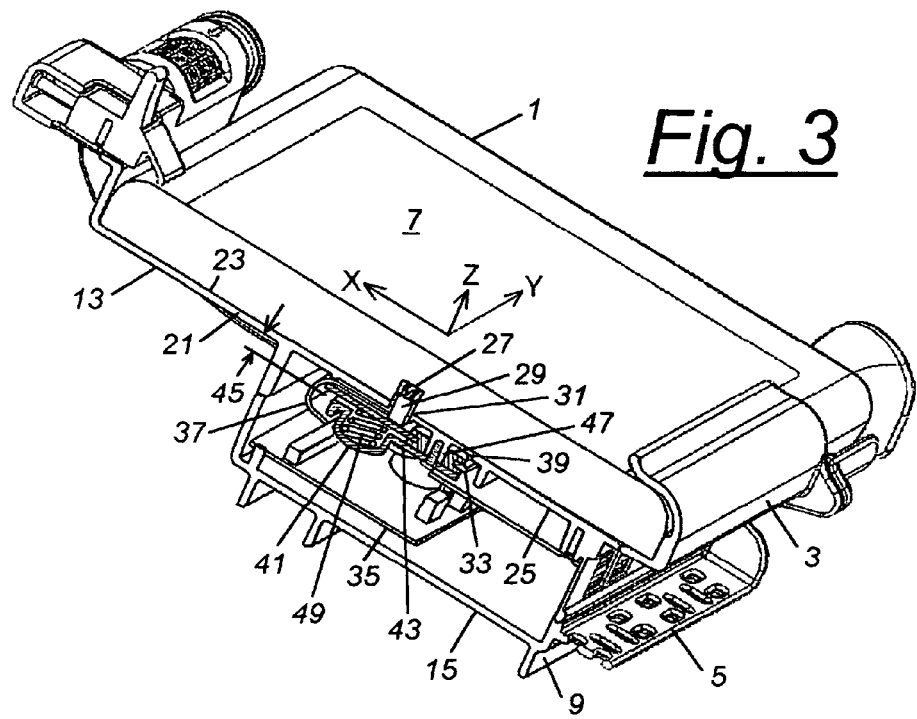
FIG. 3 and FIG. 4 are different views of the docking station of FIGS. 1 and 2, each showing a cross-sections of the expansion module.
Figure 4:
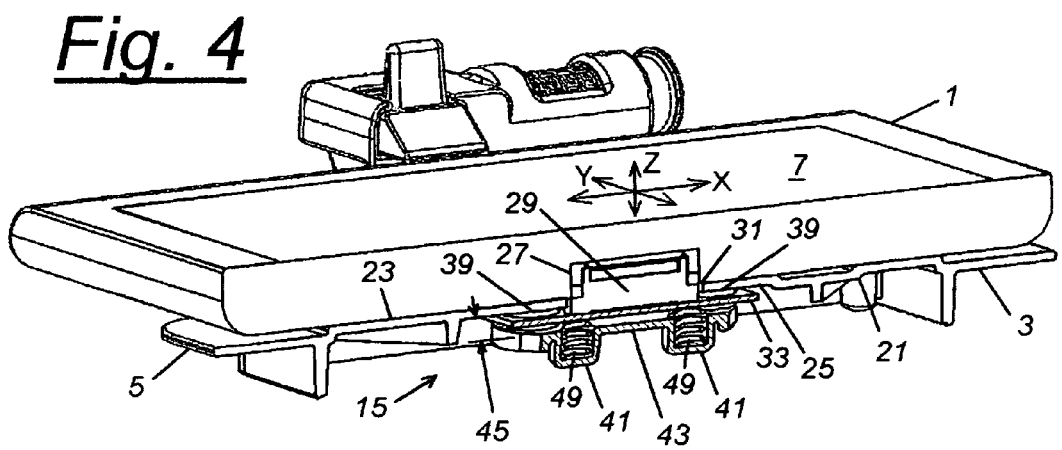

FIG. 3 and FIG. 4 are different cross-section views of docking station 5 wherein docking tray 3 is formed with a device bearing plate 21 having external bearing surface 23 where portable computing device 1 is seated, and an opposite interface surface 25 where expansion module 15 is mounted. Portable computing device 1 includes an expansion connector port 27 for function expansion. Expansion connector port 27 is structured to receive an electrical expansion connector 29 that is provided at bearing surface 23. For example, electrical expansion connector 29 is projected through an aperture 31 formed through bearing plate 21 between its external bearing surface 23 and opposing interface surface 25. Aperture 31 is sized to permit expansion connector 29 to move laterally in the plane of bearing plate 21 to reposition sufficiently to mate with expansion connector port 27 when portable computing device 1 is seated in docking tray 3.

Expansion connector 29 is fixedly mounted on a rigid connector carrier member 33 such as a printed circuit board (connector carrier PCB). Expansion module 15 may also include an expansion printed circuit board 35 (expansion PCB) in electrical communication with connector carrier member 33, or in direct communication with expansion connector 29, for example, through a flexible ribbon cable 37 extended therebetween.

Expansion module 15 includes a connector isolator system having both one or more in-plane isolators 39 that isolate against lateral motion in the X-Y plane of connector carrier member 33, and one or more out-of-plane Z-axis isolators 41 that isolate against out-of-plane motion along the Z-axis perpendicular to the X-Y plane, i.e., along the direction of insertion of expansion connector 29 into expansion connector port 27 of computing device 1. In-plane isolators 39 permit lateral motion in the X-Y plane of connector carrier member 33 within a limited range for mating expansion connector 29 with expansion connector port 27 of portable computing device 1. However, in-plane isolators 39 permit expansion connector 29 to remain in constant electrical connection with expansion connector port 27 only during application of lateral shock and vibration loads in the X-Y plane that cause responsive in-plane motion of computing device 1 within docking tray 3 such that communication is uninterrupted between computing device 1 and expansion PCB 35.

Unfortunately, in-plane isolators 39 only respond to lateral X-Y in-plane motion of connector carrier member 33 and expansion connector 29 fixedly mounted thereon. X-Y in-plane isolators 39 cannot respond to out-of-plane Z-axis motion of computing device 1 within docking tray 3. Rather, shock or vibration inputs that cause out-of-plane separation of computing device 1 from docking tray 3, even within a limited range, can also cause momentary separation of expansion connector 29 from expansion connector port 27 of portable computing device 1. Therefore, one or more out-of-plane Z-axis isolators 41 couple connector carrier member 33, which supports expansion connector 29, to bearing plate 21 of docking tray 3. By example and without limitation, out-of-plane Z-axis isolators 41 include a rigid backstop 43 that is spaced a fixed offset distance 45 away from an interface surface by a spacer 47. Connector carrier member 33, having one or more in-plane isolators 39, is movably positioned between backstop 43 and interface surface 25 of bearing plate 21 so as to be movable out-of-plane, i.e., along the Z-axis. One or more biasing members 49, by example and without limitation coil compression springs (shown), resiliently urge connector carrier member 33 out-of-plane along the Z-axis toward bearing plate 21 of docking tray 3, whereby expansion connector 29 is positively urged toward computing device 1 and into constant engagement with expansion connector port 27, even when shock or vibration inputs cause out-of-plane separation of computing device 1 from bearing plate 21 of docking tray 3.

Figure 5:
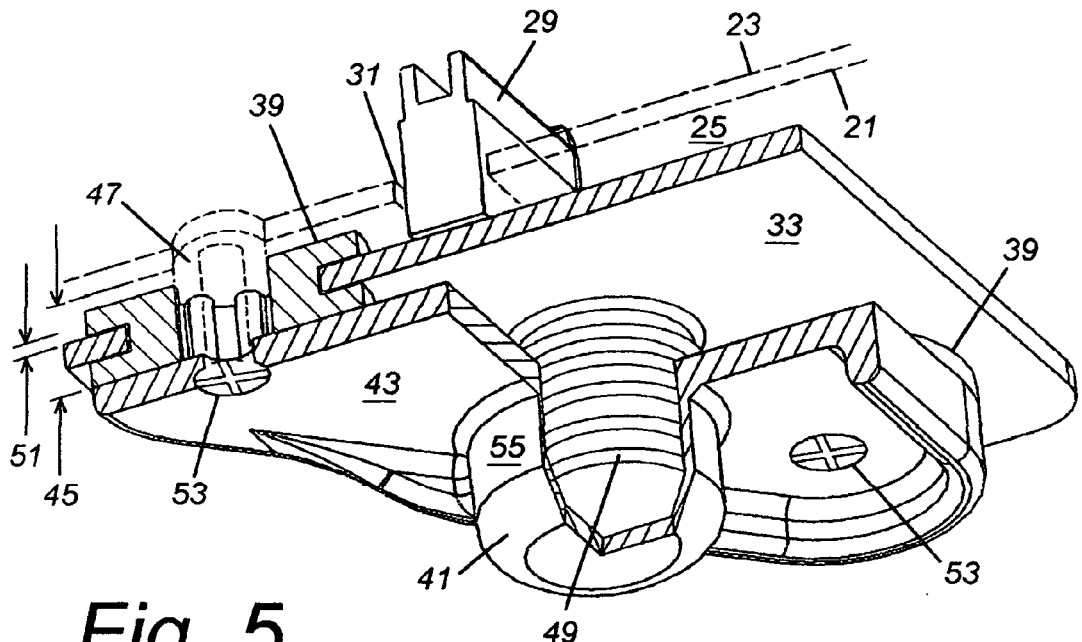
FIG. 5 and FIG. 6 show details of an out-of-plane Z-axis isolator of the invention.

FIG. 5 shows details of out-of-plane Z-axis isolators 41 wherein connector carrier member 33 is displaced along Z-axis away from interface surface 25 of bearing plate 21 (shown in phantom) toward backstop 43, as when portable computing device 1 is flush against bearing surface 23 of bearing plate 21. For example, connector carrier member 33 is movable within a constant engagement range 51 between backstop 43 and interface surface 25 of bearing plate 21. Constant engagement range 51 is sized to ensure constant engagement of electrical connector 29 with expansion connector port 27 of portable computing device 1 during out-of-plane Z-axis motion of computing device 1 within docking tray 3 due to normal shock or vibration inputs that cause out-of-plane separation of computing device 1 from docking tray 3. For example, constant engagement range 51 is, but not limited to, about 0.060 inch for the present application, wherein shock and vibration regimens result in out-of-plane separation of about 0.040 inch of computing device 1 from docking tray 3, whereby out-of-plane separation cannot exceed constant engagement range 51 of out-of-plane Z-axis isolators 41. According to one embodiment, connector carrier member 33 is coupled to bearing plate 21 of docking tray 3 by threaded fasteners or other retainers 53 joined to bearing plate 21 through spacers 47, and constant engagement range 51 is set by the length of spacers 47. When portable computing device 1 is seated on external bearing surface 23 of docking tray 3 with expansion connector port 27 mated with expansion connector 29 through aperture 31, biasing members 49 are compressed along Z-axis into respective sockets or other receivers 55 formed in backstop 43. Simultaneously, in-plane isolators 39 slide along length of respective spacers 47 for at least a portion of constant engagement range 51 or until bottoming out against backstop 43, and connector carrier member 33 is forced against expansion of biasing members 49 away from interface surface 25 of bearing plate 21.

Figure 6:
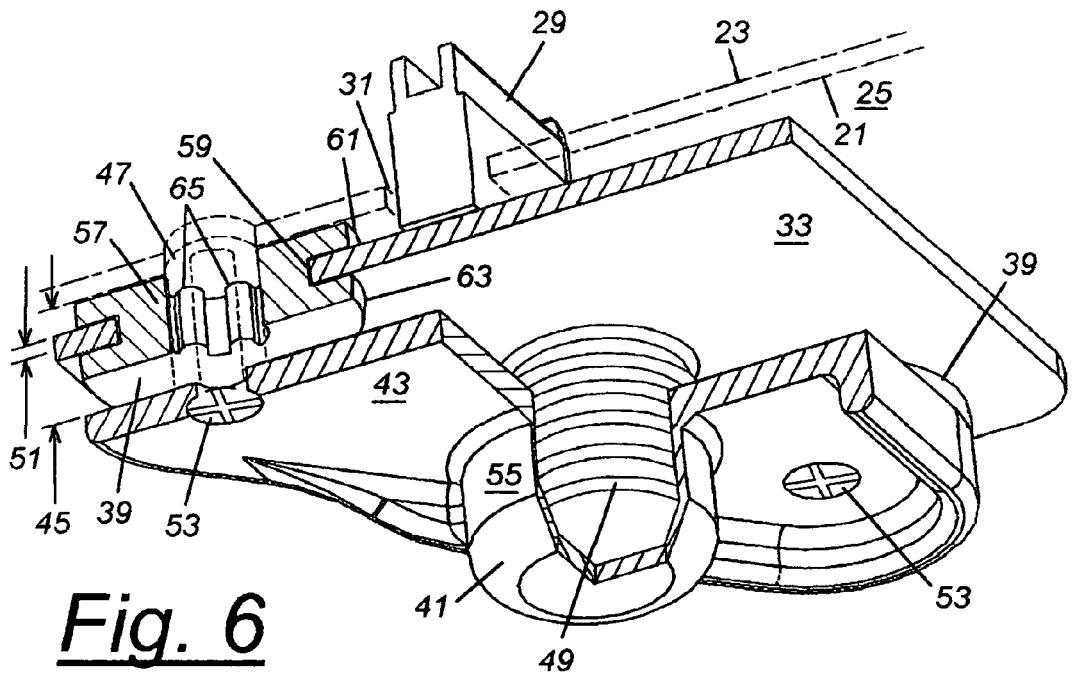

FIG. 6 shows details of out-of-plane Z-axis isolators 41 wherein connector carrier member 33 is displaced along Z-axis away from backstop 43 toward interface surface 25 bearing plate 21 (shown in phantom), as when shock or vibration inputs cause out-of-plane separation of computing device 1 away from bearing surface 23 of bearing plate 21. Here, biasing members 49 are expanded along Z-axis between backstop 43 and interface surface 25 of bearing plate 21. Simultaneously, in-plane isolators 39 slide along length of respective spacers 47 for at least a portion of constant engagement range 51 or until bottoming out against interface surface 25 of bearing plate 21, and connector carrier member 33 is forced by expansion of biasing members 49 away from backstop 43 and toward interface surface 25 of bearing plate 21. Accordingly, expansion connector 29 is projected through aperture 31 to remain in mated connection with expansion connector port 27 of computing device 1.

Here, in-plane isolators 39 are elastomeric bushings having a central tube 57 fit through an aperture 59 through connector carrier member 33, and upper and lower lips 61, 63 positioned on opposites of connector carrier member 33. A plurality of elastomeric isolation spokes 65 are projected radially inwardly of central tube 57. Spacers 47 are slidingly received through isolator tube 57 between isolation spokes 65. During initial seating of computing device 1, isolation spokes 65 bend radially under lateral X-Y in-plane pressure of spacers 47 to lateral X-Y in-plane motion of connector carrier member 33 to accommodate mating of expansion connector 29 with expansion connector port 27 of portable computing device 1. When docking station 5 is subjected to lateral shock and vibration loads in the X-Y plane, isolation spokes 65 bend radially to permit limited lateral X-Y in-plane motion of connector carrier member 33 to maintain constant lateral engagement of expansion connector 29 with expansion connector port 27. However, as disclosed herein, X-Y in-plane isolators 39 cannot respond to out-of-plane Z-axis motion of computing device 1 within docking tray 3, such that shock and/or vibration inputs having an out-of-plane Z-axis component potentially interrupt communication between expansion PCB 35 and computing device 1.

Figure 7:
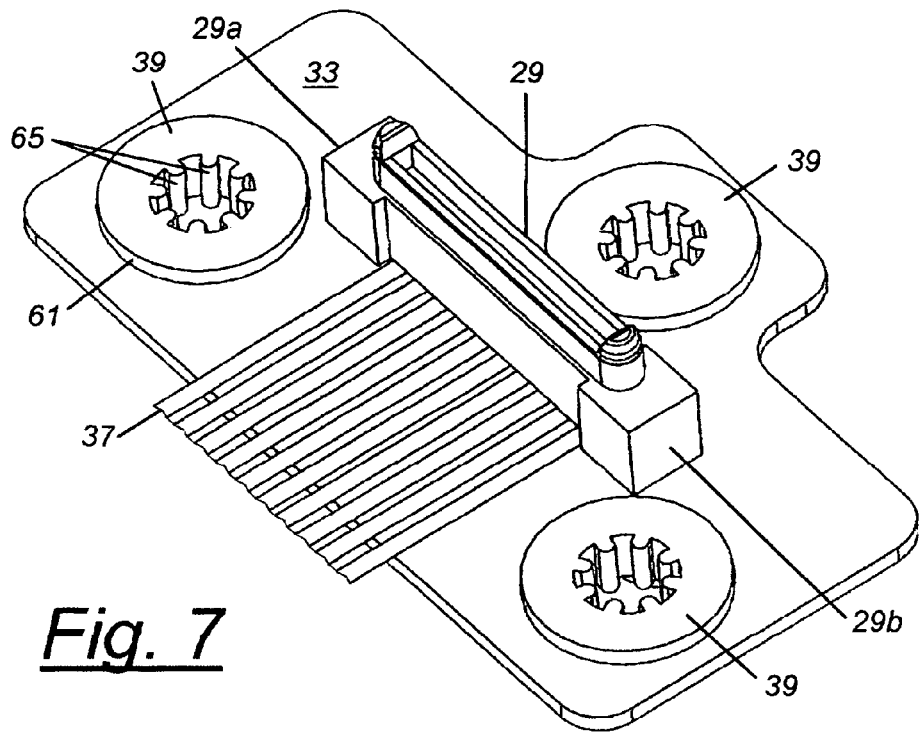
FIG. 7 shows an expansion connector mounted on a PCB or other connector carrier member with three in-plane isolators.

FIG. 7 shows expansion connector 29 mounted on connector carrier member 33 with in-plane isolators 39.

Figure 8:
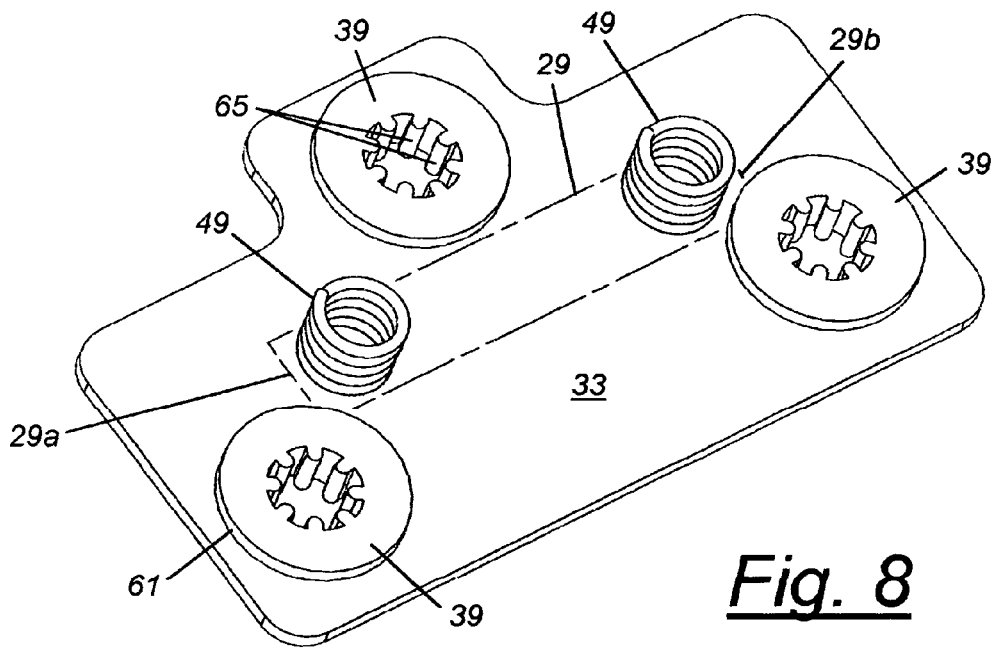
FIG. 8 shows an opposite side of the connector carrier member from FIG. 7.

FIG. 8 shows connector carrier member 33 opposite from expansion connector 29 and having in-plane isolators 39 with footprint of expansion connector 29 (shown in phantom). Biasing members 49 of two or more out-of-plane Z-axis isolators 41 are positioned on connector carrier 33 between a triangular plurality of X-Y in-plane lateral shock and vibration isolators 39. For example, as shown here, biasing members 49 are positioned opposite from expansion connector 29, and substantially aligned with end portions 29a, 29b thereof (shown in FIG. 7).

Figure 9:
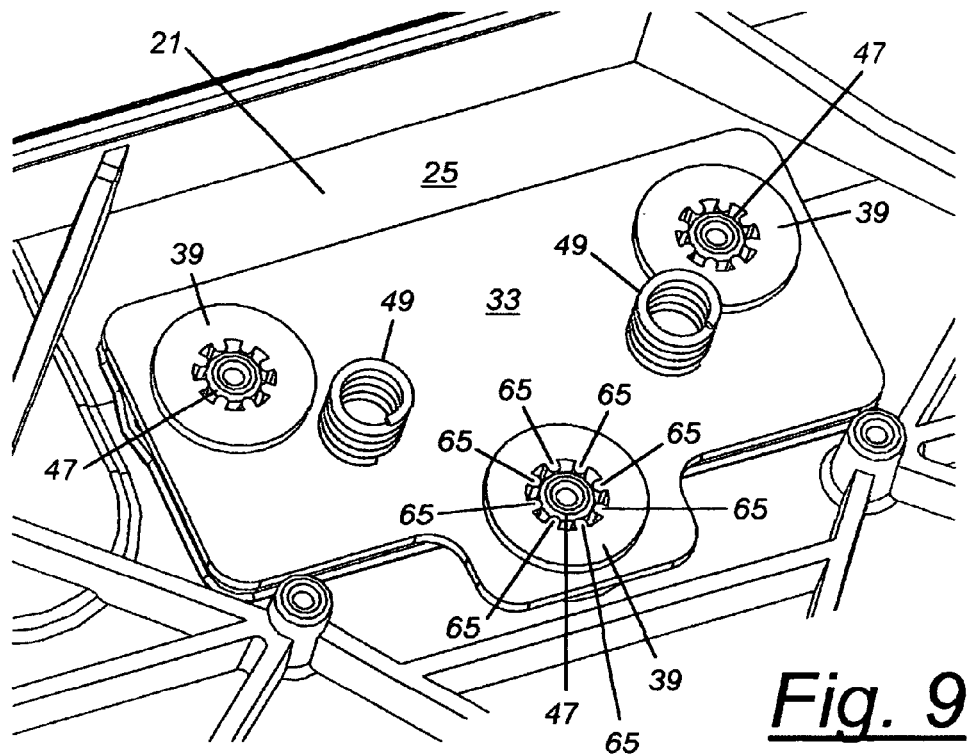
FIG. 9 illustrates the connector carrier positioned on a bearing plate of the docking tray.

FIG. 9 illustrates connector carrier member 33 positioned on bearing plate 21 of docking tray 3 with X-Y in-plane lateral shock and vibration isolators 39 slidingly installed over a triangular arrangement of spacers 47 projected from interface surface 25 of bearing plate 21. Connector carrier member 33 is thus slidingly suspended between backstop 43 and interface surface 25 of bearing plate 21. Accordingly, connector carrier member 33 is slidably movable out-of-plane, i.e., along the Z-axis, by lateral shock and vibration isolators 39 sliding along respective spacers 47. Backstop 43 is shown removed here to show biasing members 49.

Figure 10:
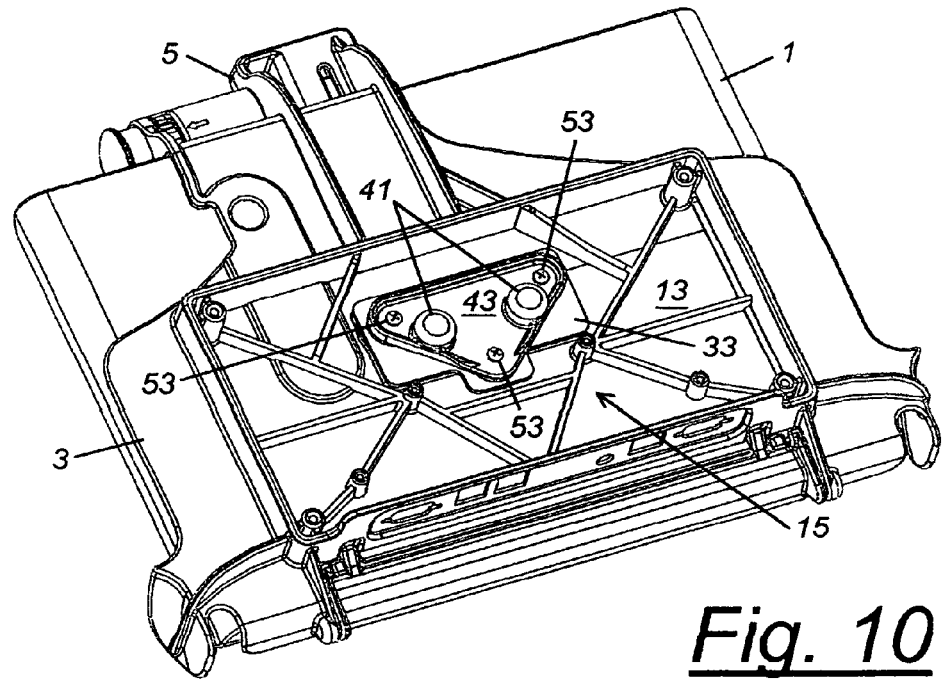
FIG. 10 illustrates the connector carrier member sandwiched between an interface surface of the bearing plate and a rigid backstop.

FIG. 10 illustrates connector carrier member 33 sandwiched between interface surface 25 of bearing plate 21 and backstop 43. As disclosed herein, biasing members 49 are captured between connector carrier member 33 and backstop 43 for resiliently urging connector carrier member 33 out-of-plane along the Z-axis toward bearing plate 21 of docking tray 3.

Figure 11:
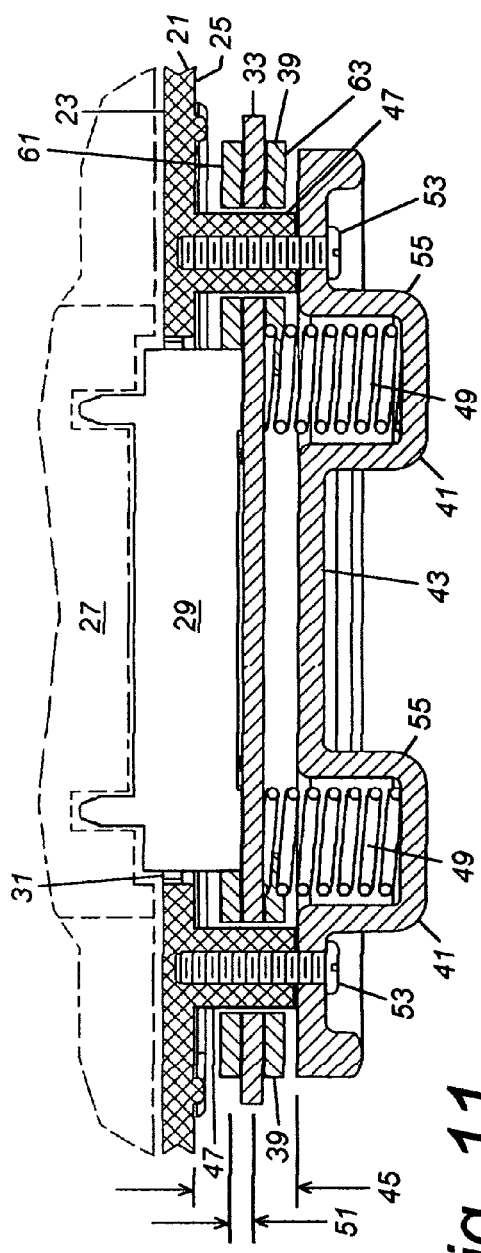
FIG. 11 and FIG. 12 both illustrate the connector carrier member operated in combination with two of the out-of-plane Z-axis isolators.
Figure 12:
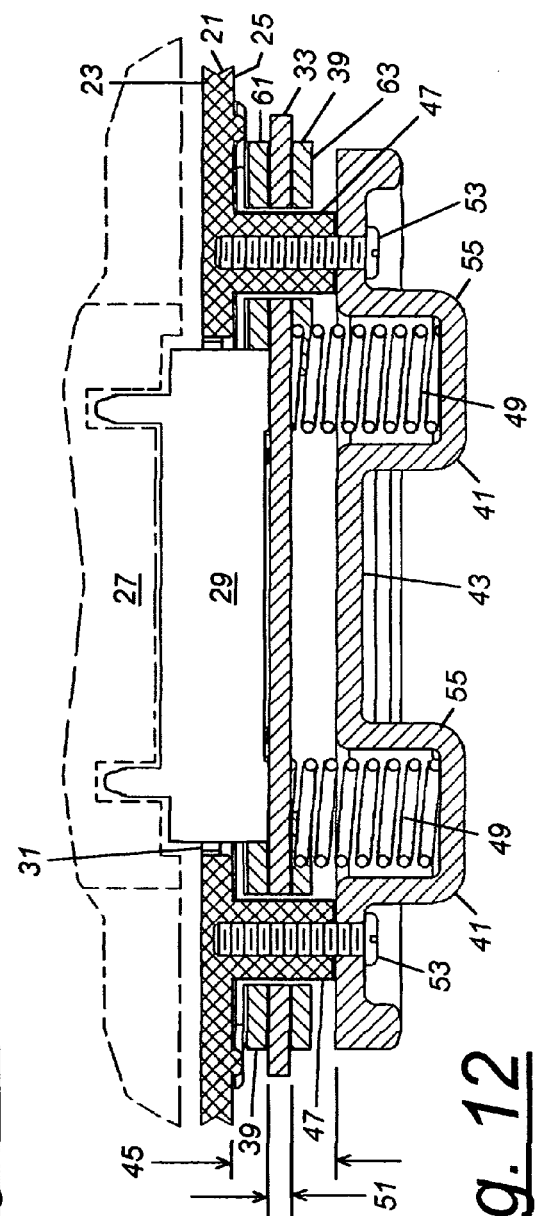

FIG. 11 and FIG. 12 both illustrate connector carrier member 33 operated in combination with out-of-plane Z-axis isolators 41. In both FIG. 11 and FIG. 12, portable computing device 1 is positioned on bearing plate 21 of docking tray 3. Furthermore, expansion connector 29 is constantly mated with expansion connector port 27 of portable computing device 1.

In FIG. 11, portable computing device 1 is seated substantially flush against external bearing surface 23 of bearing plate 21. Accordingly, expansion connector port 27 of computing device 1 is positioned adjacent to aperture 31 in bearing plate 21. Connector carrier member 33 is displaced away from bearing plate 21 and toward spaced-away backstop 43 by mating of expansion connector 29 with expansion connector port 27 of portable computing device 1. When computing device 1 is seated substantially flush against external bearing surface 23 of bearing plate 21, displacement of connector carrier member 33 toward backstop 43 compresses biasing members 49 into sockets 55 or otherwise against backstop 43, while retainers 53 fix backstop 43 against spacers 47 of out-of-plane Z-axis isolators 41 at fixed offset distance 45 from bearing plate 21. Connector carrier member 33 is thus under constant pressure of compressed biasing members 49 to push expansion connector 29 into mating contact with expansion connector port 27 of portable computing device 1.

In FIG. 12, portable computing device 1 is lifted away from external bearing surface 23 of bearing plate 21, as by application of shock and/or vibration inputs having an out-of-plane Z-axis component. In response to portable computing device 1 being lifted away from external bearing surface 23 of bearing plate 21, out-of-plane Z-axis isolators 41 automatically operate to responsively urge expansion connector 29 into mating contact with expansion connector port 27 of portable computing device 1.

Here, compressed biasing members 49 automatically operate between bearing plate 21 and backstop 43 by expanding to displace connector carrier member 33 along spacers 47 toward interface surface 25 of bearing plate 21. Expanding biasing members 49 in turn pushes expansion connector 29 into maintaining constant mating contact with expansion connector port 27 of portable computing device 1. Therefore, out-of-plane Z-axis isolators 41 automatically maintain expansion connector 29 in maintaining constant mating contact with expansion connector port 27 of portable computing device 1 within constant engagement range 51 of connector carrier member 33, as disclosed herein.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A connector isolator system, comprising:
   a backstop spaced a fixed distance away from an interface surface;
   a connector carrier member movable between the backstop and the interface surface, and further comprising one or more in-plane isolators;
   an electrical connector mounted on the connector carrier member in a position to pass through an aperture in the interface surface; and
   one or more biasing members arranged between the backstop and the connector carrier member for urging the connector carrier member toward the interface surface.

2. The connector isolator system of claim 1, further comprising one or more retainers retaining the backstop spaced at the fixed distance away from the interface surface.

3. The connector isolator system of claim 2, further comprising one or more spacers between the backstop and the interface surface.

4. The connector isolator system of claim 1, wherein the connector carrier member is movable within a fixed engagement range between the backstop and the interface surface.

5. The connector isolator system of claim 4, wherein the one or more biasing members further comprises one or more compression springs.

6. The connector isolator system of claim 4, wherein the one or more in-plane isolators are further slidable along the one or more spacers.

7. The connector isolator system of claim 6, wherein the one or more in-plane isolators further comprises an elastomeric bushing comprising a plurality of elastomeric radially projected isolation spokes spaced to sliding receive therein a respective one of the one or more spacers.

8. A connector isolator system, comprising:
   a device bearing plate comprising a bearing surface and an interface surface opposite therefrom with an aperture therebetween sized for accommodating an electrical connector;
   a connector carrier member positionable adjacent to the interface surface of the bearing plate and further comprising one or more in-plane isolators;
   an electrical connector mounted on a first surface of the connector carrier member in a position to pass through the aperture in the bearing plate when the connector carrier member is further positioned adjacent to the interface surface of the bearing plate;
   a backstop positioned adjacent to a second surface of the connector carrier member opposite from the first surface thereof having the electrical connector mounted thereon, the connector carrier member backstop being spaced an offset distance greater than a thickness of the connector carrier member away from the interface surface of the bearing plate with the connector carrier member being movably suspended therebetween;

one or more retainers retaining the backstop spaced the offset distance away from the interface surface of the bearing plate; and one or more biasing members arranged between the second surface of the connector carrier member and the backstop for urging the connector carrier member away from the backstop and toward the interface surface of the bearing plate.

9. The connector isolator system of claim 8, further comprising one or more spacers between the backstop and the interface surface of the bearing plate.

10. The connector isolator system of claim 9, wherein each of the one or more in-plane isolators further comprises an elastomeric bushing comprising a central tube within an aperture through the connector carrier member, the elastomeric bushing further comprising a plurality of isolator spokes projecting inwardly of the central tube thereof to slidingly receive therethrough a respective one of the spacers.

11. The connector isolator system of claim 8, further comprising a plurality of the biasing members arranged between the second surface of the connector carrier member and the backstop.

12. The connector isolator system of claim 11, wherein the plurality of the biasing members further comprises a plurality of compression springs.

13. The connector isolator system of claim 12, wherein the backstop further comprises a socket receiving a respective one of each of the plurality of the biasing members.

14. The connector isolator system of claim 13, further comprising a plurality of the in-plane isolators.

15. The connector isolator system of claim 8, wherein the connector carrier member further comprises a printed circuit board.

16. A connector isolator system, comprising:
a docking tray comprising a device bearing plate formed with an external bearing surface and an interface surface opposite therefrom with an aperture therebetween and sized for accommodating an electrical connector; and
an expansion module, comprising:
a connector carrier member comprising an electrical connector mounted on a first surface thereof facing toward the interface surface of the device bearing plate in a position to pass through the aperture in the bearing plate;
a backstop positioned adjacent to a second surface of the connector carrier member opposite from the first surface thereof;
a plurality of spacers positioned between the backstop and the interface surface of the bearing plate and spacing the backstop an offset distance away from the interface surface of the bearing plate, wherein the offset distance is greater than a thickness of the connector carrier member;
a plurality of retainers retaining the backstop to the plurality of spacers at the offset distance away from the interface surface of the bearing plate;
a plurality of in-plane isolators movably suspending the connector carrier member relative to the plurality of spacers between the backstop and the interface surface of the bearing plate within the offset distance therebetween; and
a plurality of biasing members arranged between the second surface of the connector carrier member and the backstop for urging the connector carrier member away from the backstop and toward the interface surface of the bearing plate.

17. The connector isolator system of claim 16, wherein the plurality of biasing members further comprises a plurality of coil compression springs.

18. The connector isolator system of claim 16, wherein the backstop further comprises a plurality of sockets sized to receive thereinto the plurality of biasing members.

19. The connector isolator system of claim 16, wherein the connector carrier member further comprises a plurality of apertures therethrough; and
wherein the plurality of in-plane isolators further comprises an elastomeric bushing comprising upper and lower lips positioned on opposites of the connector carrier member with a central tube therebetween within the aperture through the connector carrier member, the elastomeric bushing further comprising a plurality of isolator spokes projecting inwardly of the central tube thereof spaced to slidingly receive therethrough a respective one of the spacers.

20. The connector isolator system of claim 16, wherein the connector carrier member further comprises a printed circuit board.

* * * * *